US012264916B2

United States Patent
Gando et al.

(10) Patent No.: US 12,264,916 B2
(45) Date of Patent: Apr. 1, 2025

(54) SENSOR AND ELECTRONIC DEVICE

(71) Applicant: KABUSHIKI KAISHA TOSHIBA, Tokyo (JP)

(72) Inventors: Ryunosuke Gando, Yokohama Kanagawa (JP); Daiki Ono, Yokohama Kanagawa (JP); Yasushi Tomizawa, Tokyo (JP); Fumito Miyazaki, Yokohama Kanagawa (JP); Shiori Kaji, Kawasaki Kanagawa (JP); Kei Masunishi, Kawasaki Kanagawa (JP); Hiroki Hiraga, Saitama Saitama (JP); Etsuji Ogawa, Kawasaki Kanagawa (JP); Kengo Uchida, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 38 days.

(21) Appl. No.: 17/818,095

(22) Filed: Aug. 8, 2022

(65) Prior Publication Data

US 2023/0152099 A1    May 18, 2023

(30) Foreign Application Priority Data

Nov. 17, 2021 (JP) ................................. 2021-187035

(51) Int. Cl.
*G01C 19/5776* (2012.01)
*G01C 19/5642* (2012.01)
(Continued)

(52) U.S. Cl.
CPC ..... *G01C 19/5776* (2013.01); *G01C 19/5642* (2013.01); *G01C 19/5712* (2013.01);
(Continued)

(58) Field of Classification Search
CPC ............ G01C 19/5776; G01C 19/5712; G01C 19/5642; G01P 15/097; G01P 15/0802;
(Continued)

(56) References Cited

U.S. PATENT DOCUMENTS

| 5,872,313 A | * | 2/1999 | Zarabadi | G01C 19/5684 |
| | | | | 73/497 |
| 5,889,207 A | * | 3/1999 | Lutz | G01C 19/5684 |
| | | | | 73/504.12 |

(Continued)

FOREIGN PATENT DOCUMENTS

| CN | 104820113 A | 8/2015 |
| EP | 3 147 674 A1 | 3/2017 |

(Continued)

*Primary Examiner* — Helen C Kwok
(74) *Attorney, Agent, or Firm* — Finnegan, Henderson, Farabow, Garrett & Dunner, LLP

(57) ABSTRACT

According to one embodiment, a sensor includes a sensor element, a housing provided around the sensor element, and a processor. The sensor element includes a base body including first and second base body regions, and first and second sensor parts. The first sensor part is provided in the first base body region, and includes a first sensor movable part. The second sensor part is provided in the second base body region and includes first and second beams. The processor can derive a rotation angle and an angular velocity based on a signal obtained from the first sensor movable part. The processor can detect acceleration and a temperature based on a first resonance frequency of the first beam and a second resonance frequency of the second beam. The processor can correct one of the rotation angle or the angular velocity based on one of the temperature or the acceleration.

19 Claims, 9 Drawing Sheets

(51) Int. Cl.
  *G01C 19/5712* (2012.01)
  *G01P 15/08* (2006.01)
  *G01P 15/097* (2006.01)
  *G01P 15/125* (2006.01)
(52) U.S. Cl.
  CPC ........ *G01P 15/0802* (2013.01); *G01P 15/097* (2013.01); *G01P 15/125* (2013.01)
(58) Field of Classification Search
  CPC ........... G01P 15/125; G01P 2015/0817; G01P 2015/0814
  See application file for complete search history.

(56) References Cited

U.S. PATENT DOCUMENTS

| | | | | |
|---|---|---|---|---|
| 2008/0177492 | A1* | 7/2008 | Woodmansee | G01P 21/00 702/95 |
| 2009/0255339 | A1* | 10/2009 | McNeil | G01P 15/097 29/596 |
| 2011/0066395 | A1* | 3/2011 | Judd | G01C 25/00 73/1.77 |
| 2013/0226506 | A1* | 8/2013 | Nakamura | G01P 15/097 702/145 |
| 2015/0226762 | A1* | 8/2015 | Seshia | G01K 11/26 73/495 |
| 2015/0355218 | A1* | 12/2015 | Jeong | G01C 19/5747 73/504.12 |
| 2016/0089566 | A1* | 3/2016 | Mitsunaga | G01P 1/127 702/150 |
| 2017/0115318 | A1* | 4/2017 | Kasuya | G01P 1/006 |
| 2017/0191830 | A1* | 7/2017 | Maeda | G01C 19/5776 |
| 2018/0238688 | A1* | 8/2018 | Kikuchi | G01P 15/097 |
| 2018/0252550 | A1* | 9/2018 | Kabakian | G01P 21/00 |
| 2019/0257655 | A1* | 8/2019 | Tsukamoto | G01P 15/0802 |
| 2019/0265269 | A1* | 8/2019 | Yamashita | G01B 21/00 |
| 2019/0285663 | A1* | 9/2019 | Chino | G01P 15/18 |
| 2019/0334540 | A1* | 10/2019 | Kobayashi | H03M 1/1245 |
| 2020/0025792 | A1* | 1/2020 | Reinke | G01P 15/097 |
| 2020/0284582 | A1 | 9/2020 | Kaji et al. | |
| 2020/0363205 | A1 | 11/2020 | Gando et al. | |
| 2021/0381831 | A1 | 12/2021 | Gando et al. | |
| 2021/0396780 | A1 | 12/2021 | Masunishi et al. | |
| 2022/0137081 | A1* | 5/2022 | Otani | G01P 1/006 73/497 |
| 2022/0137085 | A1* | 5/2022 | Masunishi | G01P 15/08 73/514.15 |
| 2023/0062441 | A1* | 3/2023 | Masunishi | B81B 3/0021 |

FOREIGN PATENT DOCUMENTS

| | | |
|---|---|---|
| EP | 4 075 096 A1 | 10/2022 |
| JP | 2020-144065 A | 9/2020 |
| JP | 2020-187018 A | 11/2020 |
| JP | 2021-192012 A | 12/2021 |
| JP | 2022-1828 A | 1/2022 |

* cited by examiner

SENSOR AND ELECTRONIC DEVICE

CROSS-REFERENCE TO RELATED APPLICATIONS

This application is based upon and claims the benefit of priority from Japanese Patent Application No. 2021-187035, filed on Nov. 17, 2021; the entire contents of which are incorporated herein by reference.

FIELD

Embodiments described herein relate generally to a sensor and an electronic device.

BACKGROUND

There is a sensor such as a gyro sensor or the like. It is desirable to improve the detection accuracy of a sensor and an electronic device.

DETAILED DESCRIPTION

Figure 1A:
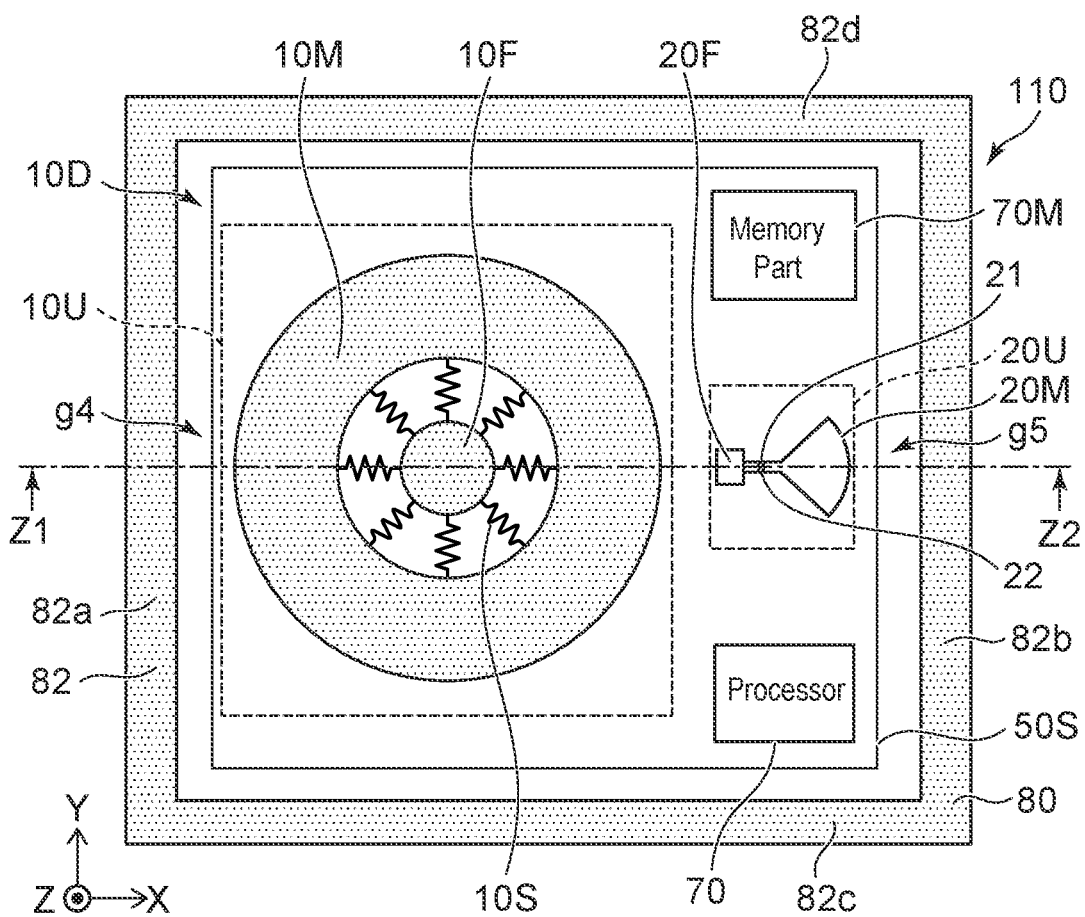
FIGS. 1A and 1B are schematic views illustrating a sensor according to a first embodiment.

According to one embodiment, a sensor includes a sensor element, a housing provided around the sensor element, and a processor. The sensor element includes a base body including a first base body region and a second base body region, a first sensor part, and a second sensor part. The first sensor part is provided in the first base body region. The first sensor part includes a first sensor movable part which can vibrate. Vibration of the first sensor movable part includes a first component in a first direction and a second component in a second direction crossing the first direction. The second sensor part is provided in the second base body region and includes a first beam and a second beam. The processor is configured to derive a rotation angle and an angular velocity based on a signal obtained from the first sensor movable part. The processor is configured to detect acceleration and a temperature based on a first resonance frequency of the first beam and a second resonance frequency of the second beam. The processor is configured to correct at least one of the rotation angle or the angular velocity based on at least one of the temperature or the acceleration.

According to one embodiment, an electronic device includes the sensor described above, and a circuit controller configured to control a circuit based on a signal obtained from the sensor.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
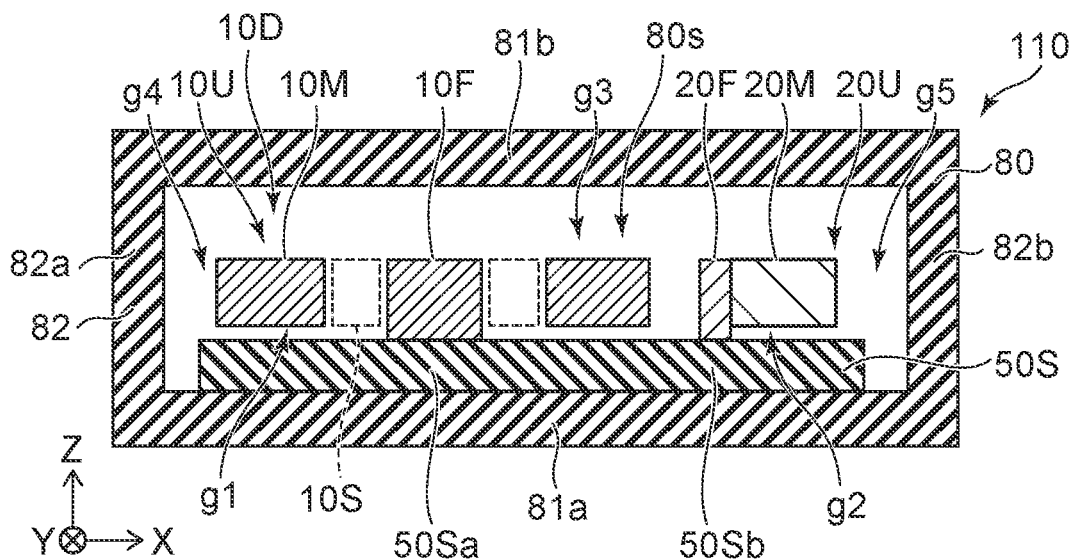

FIGS. 1A and 1B are schematic views illustrating a sensor according to a first embodiment.

FIG. 1A is a plan view. FIG. 1B is a cross-sectional view taken along the line Z1-Z2 of FIG. 1A.

As shown in FIGS. 1A and 1B, a sensor 110 according to the first embodiment includes a sensor element 10D, a housing 80, and a processor 70.

The housing 80 is provided around the sensor element 10D. For example, the housing 80 surrounds the sensor element 10D. In this example, at least a part of the processor 70 is surrounded by the housing 80. The atmospheric pressure in the space 80s inside the housing 80 is less than 1 atm.

As shown in FIG. 1B, for example, the housing 80 includes a first member 81a and a second member 81b. The second member 81b is connected with the first member 81a. The first member 81a is, for example, a bottom portion. The second member 81b is, for example, a lid portion. FIG. 1A illustrates a state in which the second member 81b is removed.

The sensor element 10D is between the first member 81a and the second member 81b. A direction from the first member 81a to the second member 81b is a Z-axis direction. One direction perpendicular to the Z-axis direction is defined as an X-axis direction. A direction perpendicular to the Z-axis direction and the X-axis direction is defined as a Y-axis direction.

As shown in FIGS. 1A and 1B, the housing 80 further includes a side member 82. The side member 82 is connected with the first member 81a and the second member 81b. There is the sensor element 10D between multiple regions of the side member 82 in a direction crossing the direction from the first member 81a to the second member 81b (Z-axis direction).

As shown in FIG. 1A, the side member 82 includes first to fourth side member regions 82a to 82d. For example, in the X-axis direction, the sensor element 10D is between the first side member region 82a and the second side member region 82b. For example, in the Y-axis direction, the sensor element 10D is between the third side member region 82c and the fourth side member region 82d. The sensor element 10D is airtightly sealed in the space 80s inside the housing 80.

As shown in FIG. 1B, the sensor element 10D includes a base body 50S, a first sensor part 10U, and a second sensor part 20U. The base body 50S includes a first base body region 50Sa and a second base body region 50Sb. The first sensor part 10U is provided in the first base body region 50Sa. The first sensor part 10U includes a first sensor movable part 10M. The first sensor movable part 10M can vibrate. This vibration includes a first component in the first direction and a second component in the second direction. The second direction crosses the first direction. For example, the first and second directions cross the Z-axis direction.

As shown in FIG. 1B, in this example, the first sensor part 10U includes a first sensor fixed part 10F and the first sensor supporter 10S. The first sensor fixed part 10F is fixed to the first base body region 50Sa. The first sensor supporter 10S is supported by the first sensor fixed part 10F. The first sensor supporter 10S supports the first sensor movable part 10M. As shown in FIG. 1B, a first gap g1 is provided between the base body 50S and the first sensor supporter 10S, and between the base body 50S and the first sensor movable part 10M.

As shown in FIG. 1B, the second sensor part 20U is provided in the second base body region 50Sb. The second sensor part 20U includes a first beam 21 and a second beam 22 (see FIG. 1A).

In this example, the second sensor part 20U includes the second sensor fixed part 20F and the second sensor movable part 20M. The second sensor fixed part 20F is fixed to the second base body region 50Sb. The second sensor movable part 20M is supported by the second sensor fixed part 20F. As will be described later, the first beam 21 is included in the first movable beam. As will be described later, the second beam 22 is included in the second movable beam. These movable beams are included in the second sensor movable part 20M. As shown in FIG. 1B, a second gap g2 is provided between the base body 50S and the second sensor movable part 20M.

As shown in FIG. 1B, the base body 50S is fixed to the first member 81a. A third gap g3 is provided between the first sensor movable part 10M and the second member 81b, and between the second sensor movable part 20M and the second member 81b. As will be described later, the third gap g3 is provided between the first beam 21 and the second member 81b, and between the second beam 22 and the second member 81b.

A fourth gap g4 is provided between the first sensor movable part 10M and the side member 82. A fifth gap g5 is provided between the first beam 21 and the side member 82.

Due to these gaps, the first sensor movable part 10M can move. Due to these gaps, the second sensor movable part 20M (first beam 21, second beam 22, etc.) can move.

The processor 70 is configured to derive the rotation angle and the angular velocity based on the signal obtained from the first sensor movable part 10M. The first sensor part 10U is, for example, an angle gyro sensor. The first sensor part 10U is, for example, a RIG (Rate Integrating Gyroscope). The first sensor part 10U can directly measure the rotation angle of the detection target. An example of the first sensor part 10U will be described later.

The processor 70 is configured to detect the acceleration and the temperature based on a first resonance frequency of the first beam 21 and a second resonance frequency of the second beam 22. For example, when the acceleration is applied to the second sensor part 20U, stress is applied to the first beam 21 and the second beam 22. This changes the resonance characteristics of each of these beams. The difference between the first resonance frequency and the second resonance frequency changes according to the acceleration received by the second sensor part 20U. The acceleration can be detected by detecting the difference in frequency.

On the other hand, the resonance frequency has a temperature dependence. The temperature is detected by analyzing the temperature characteristics of the resonance frequency. The temperature characteristics may be stored in, for example, the memory part 70M (see FIG. 1A).

In this way, the processor 70 can detect the rotation angle, the angular velocity (rotational angular velocity), the acceleration (translational acceleration), and the temperature based on the information obtained from the first sensor part 10U and the second sensor part 20U. The sensor 110 is, for example, an IMU (Inertial Measurement Unit).

In the embodiment, the processor 70 is configured to correct at least one of the rotation angle or the angular velocity based on at least one of the detected temperature or the detected acceleration. As a result, high accuracy can be obtained. According to the embodiment, it is possible to provide a sensor capable of improving accuracy.

In the embodiment, the processor 70 may be configured to correct at least one of the acceleration and the temperature based on the detected angular velocity. Higher accuracy can be obtained. The processor 70 is configured to correct the acceleration based on the detected angular velocity. Higher accuracy can be obtained.

Figure 2:
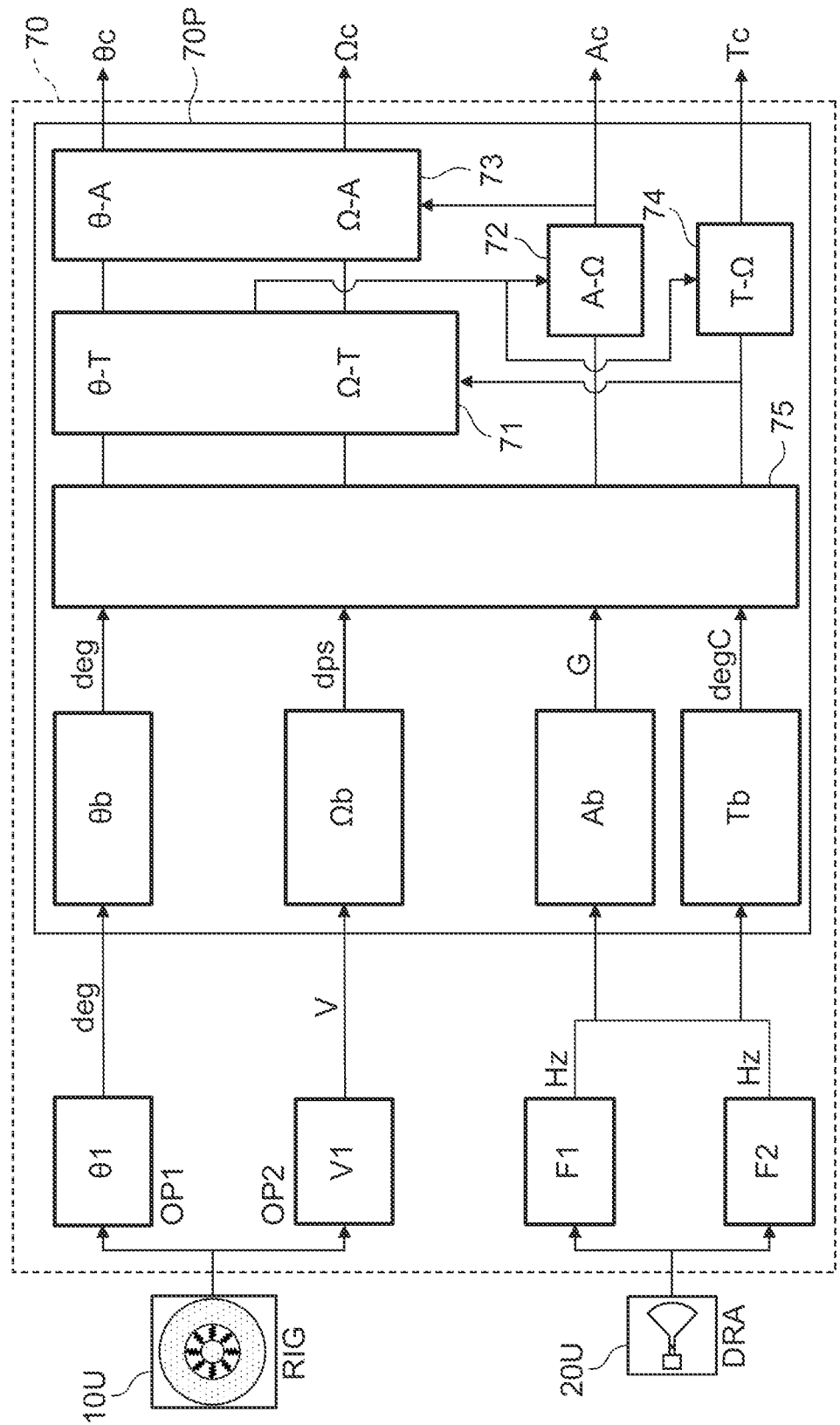
FIG. 2 is a schematic diagram illustrating the operation of the sensor according to the first embodiment.

FIG. 2 is a schematic diagram illustrating the operation of the sensor according to the first embodiment.

FIG. 2 illustrates the operation of the processor 70. As shown in FIG. 2, the processor 70 is configured to perform a first mode OP1 and a second mode OP2. For example, the first mode OP1 and the second mode OP2 are switched and performed. As will be described later, the processor 70 may be configured to further perform another mode.

In the first mode OP1, the processor 70 is configured to derive the rotation angle. For example, in the first mode OP1, the processor 70 acquires a signal from the first sensor part 10U (RIG). The first component and the second component of the vibration change due to the rotational force received by the first sensor movable part 10M. The change is based, for example, on the Coriolis force. The signal includes a first amplitude of the first component along the first direction of the vibration of the first sensor movable part 10M and a second amplitude of the second component along the two directions of the vibration of the first sensor movable part 10M. For example, the processor 70 derives an angle output $\theta 1$ based on a ratio of the first amplitude and the second amplitude. For example, the first amplitude is "Ax" and the second amplitude is "Ay". The angle output $\theta 1$ corresponds to, for example, tan-1 (−Ay/Ax). The first mode OP1 corresponds to, for example, a WA (Whole Angle) mode. The angular output $\theta 1$ is represented by, for example, "deg" (degrees). The processor 70 converts the angle output $\theta 1$ to derive the rotation angle $\theta b$. The rotation angle $\theta b$ is represented by, for example, "deg" (degrees).

In the second mode OP2, the processor 70 supplies the output V1 of the control signal that makes the vibration state (for example, the rotation angle of vibration) of the first sensor movable part 10M constant to the first sensor movable part 10M. The processor 70 is configured to derive the angular velocity based on the change in the output V1 of the control signal. The second mode OP2 corresponds to, for example, the FR (Force Rebalance) mode. The output V1 of the control signal is represented by, for example, "V" (volt). The processor 70 converts the output V1 of the control signal to derive the angular velocity $\Omega b$. The angular velocity $\Omega b$ is represented by, for example, "dps" (degree per second).

On the other hand, based on the signal obtained from the second sensor part 20U, the first resonance frequency F1 of the first beam 21 and the second resonance frequency F2 of the second beam 22 are derived. The unit of these frequencies is, for example, "Hz". The processor 70 changes these frequencies and their differences to derive the acceleration Ab and the temperature Tb. The acceleration Ab is represented by, for example, "g" or "G" or "m/s2". The unit of temperature Tb is represented by, for example, "degC" (° C.).

In this example, the processor 70 performs the initial value correction processing 75 for the rotation angle θb, the angular velocity Ωb, the acceleration Ab, and the temperature Tb. In this example, the processor 70 performs at least one of a first correction process 71, a second correction process 72, a third correction process 73, and a fourth correction process 74. In the first correction process 71, the processor 70 corrects at least one of the rotation angle θb or the angular velocity Ωb based on the temperature Tb. In the second correction process 72, the processor 70 corrects the acceleration Ab based on at least one of the rotation angle θb or the angular velocity Ωb. In the third correction process 73, the processor 70 corrects at least one of the rotation angle θb or the angular velocity Ωb based on the acceleration Ab. In the fourth correction process 74, the temperature Tb is corrected based on at least one of the rotation angle θb or the angular velocity Ωb.

By such correction processes, the corrected rotation angle θc, the corrected angular velocity Ωc, the corrected acceleration Ac, and the corrected temperature Tc can be obtained.

Such processes may be performed, for example, by process using a sensitivity matrix 70P. Hereinafter, an example of the sensitivity matrix 70P will be described.

Figure 3:
FIG. 3 is a table illustrating the operation of the sensor according to the first embodiment.

FIG. 3 is a table illustrating the operation of the sensor according to the first embodiment.

FIG. 3 illustrates the sensitivity matrix 70P. The sensitivity matrix 70P includes, for example, 4×4 elements. The row of the sensitivity matrix 70P includes, for example, the angular output θ1, the output V1 of the control signal, the first resonance frequency F1 and the second resonance frequency F2. The column of the sensitivity matrix 70P includes the rotation angle θ of the estimation target, the angular velocity Ω of the estimation target, the acceleration G of the estimation target, and the temperature T of the estimation target. These values are the (true) values to be found.

In FIG. 3, "SF" is a scale factor (e.g., a coefficient). "θ-θ1", "Ω-V1", "Ω-F1", "Ω-F2", "G-θ", "G-V1", "G-F1", "G-F2", "T-θ1" and "T-V1" are conversion coefficients between the former and the latter in parentheses. "TCF1" and "TCF2" are "Temperature Coefficient of Frequency".

The processor 70 corrects the detected output based on such a matrix (sensitivity matrix 70P). As a result, the corrected rotation angle θc, the corrected angular velocity Ωc, the corrected acceleration Ac, and the corrected temperature Tc can be obtained. As shown in FIG. 3, the sensitivity matrix 70P includes an off-diagonal component (off-diagonal element). The off-diagonal component is non-zero.

Hereinafter, an example of the first sensor part 10U will be described.

Figure 4:
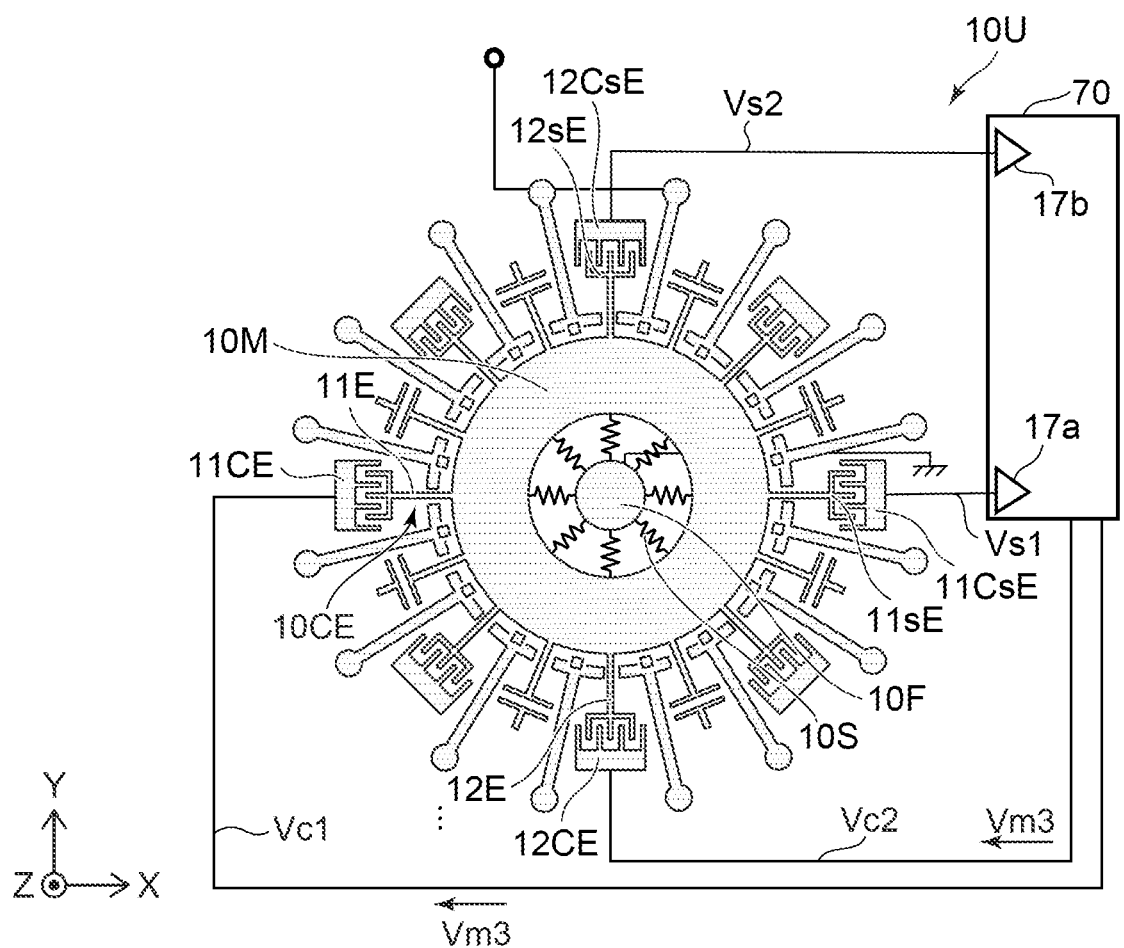
FIG. 4 is a schematic plan view illustrating a part of the sensor according to the first embodiment.

FIG. 4 is a schematic plan view illustrating a part of the sensor according to the first embodiment.

As shown in FIG. 4, the first sensor part 10U includes the first sensor fixed part 10F, the first sensor supporter 10S, and a first sensor counter electrode 10CE. As described above, the first sensor fixed part 10F is fixed to the first base body region 50Sa (see FIG. 1B). The first sensor supporter 10S is supported by the first sensor fixed part 10F. The first sensor supporter 10S supports the first sensor movable part 10M. The first sensor counter electrode 10CE faces the first sensor movable part 10M.

In the plane (X-Y plane) crossing the Z-axis direction (direction from the first base body region 50Sa to the first sensor fixed part 10F), the first sensor movable part 10M is provided around at least one of the first sensor fixed parts 10F. The first sensor movable part 10M has, for example, an annular shape.

As shown in FIG. 4, the first sensor movable part 10M includes a first vibration electrode 11E and a second vibration electrode 12E. The first sensor counter electrode 10CE includes a first counter vibration electrode 110E and a second counter vibration electrode 12CE. The first counter vibration electrode 110E faces the first vibration electrode 11E. The second counter vibration electrode 12CE faces the second vibration electrode 12E.

A direction from the first sensor fixed part 10F to the first counter vibration electrode 110E and a direction from the first sensor fixed part 10F to the second counter vibration electrode 12CE cross the Z-axis direction (direction from the first base body region 50Sa to the first sensor fixed part 10F). In this example, a direction from the first sensor fixed part 10F to the first counter vibration electrode 110E is along the Z-axis direction. A direction from the first sensor fixed part 10F to the second counter vibration electrode 12CE is along the Y-axis direction.

The direction from the first sensor fixed part 10F to the first counter vibration electrode 110E (for example, the X-axis direction) crosses the direction from the first sensor fixed part 10F to the second counter vibration electrode 12CE (for example, the Y-axis direction).

For example, the processor 70 supplies a first drive signal between the first vibration electrode 11E and the first counter vibration electrode 110E. The processor 70 supplies a second drive signal between the second vibration electrode 12E and the second counter vibration electrode 12CE. The first sensor movable part 10M vibrates due to these drive signals. Vibration has components in two directions.

As shown in FIG. 4, the first sensor movable part 10M includes a first sensing electrode 11sE and a second sensing electrode 12sE. The first sensor counter electrode 10CE includes a first counter sensing electrode 11CsE and a second counter sensing electrode 12CsE. The first counter sensing electrode 11CsE faces the first sensing electrode 11sE. The second counter sensing electrode 12CsE faces the second sensing electrode 12sE.

The first sensor fixed part 10F is between the first vibration electrode 11E and the first sensing electrode 11sE. The first sensor fixed part 10F is between the second vibration electrode 12E and the second sensing electrode 12sE. For example, with the vibration of the first sensor movable part 10M, a first sense signal Vs1 is generated between the first sensing electrode 11sE and the first counter sensing electrode 11CsE. For example, with the vibration of the first sensor movable part 10M, a second sense signal Vs2 is generated between the second sensing electrode 12sE and the second counter sensing electrode 12CsE. The processor 70 acquires these signals.

The processor 70 includes, for example, a first amplifier 17a and a second amplifier 17b. The first sense signal Vs1 is input to the first amplifier 17a. The second sense signal Vs2 is input to the second amplifier 17b. The sense signals are amplified by these amplifiers. The processor 70 detects the rotation angle based on the amplified signal. The processor 70 supplies control signals (first control signal Vc1 and second control signal Vc2) so that the vibration state of the first sensor movable part 10M becomes constant. The first control signal Vc1 is supplied to the first counter vibration electrode 110E. The second control signal Vc2 is supplied to the second counter vibration electrode 12CE. The processor 70 is configured to derive the angular velocity based on, for example, a change in the control signal.

The first gap g1 (see FIG. 1B) is provided between the base body 50S and the first vibration electrode 11E, the second vibration electrode 12E, the first sensing electrode 11sE, and the second sensing electrode 12sE.

The first counter vibration electrode 110E, the second counter vibration electrode 12CE, the first counter sensing electrode 11CsE, and the second counter sensing electrode 12CsE are fixed to the base body 50S.

In the embodiment, the processor 70 may be configured to further perform the third mode. In the third mode, the processor 70 supplies the third mode signal Vm3 to the first sensor part 10U. The third mode signal Vm3 vibrates the first sensor movable part 10M in an arbitrary state. The third mode is, for example, a VR (Virtual Rotation) mode. The third mode is performed, for example, when calibrating the sensor. For example, the first mode OP1, the second mode OP2, and the third mode are switched and performed.

Hereinafter, an example of the second sensor part 20U will be described.

Figure 5A:
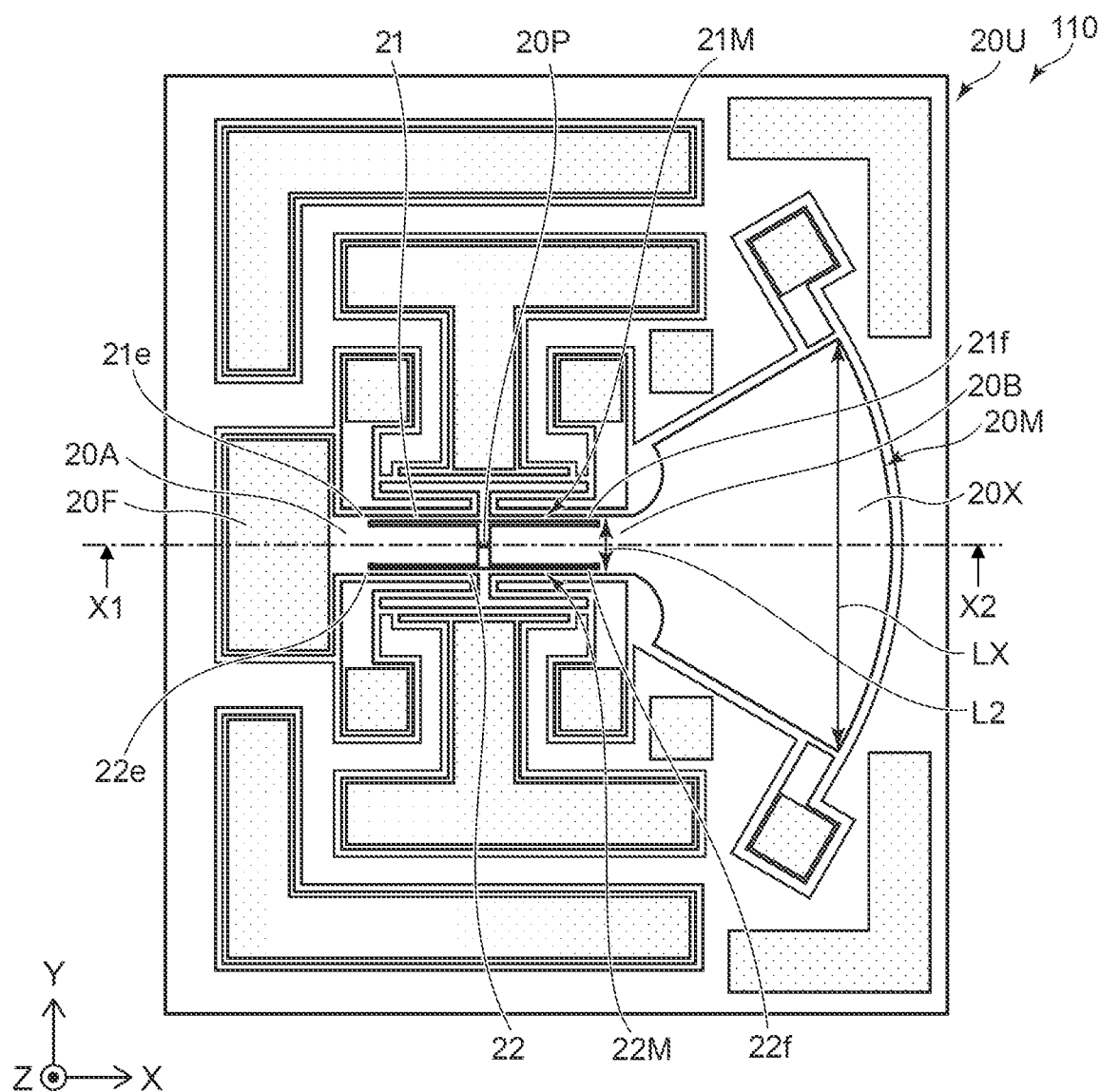
FIGS. 5A and 5B are schematic views illustrating a part of the sensor according to the first embodiment.
Figure 5B:
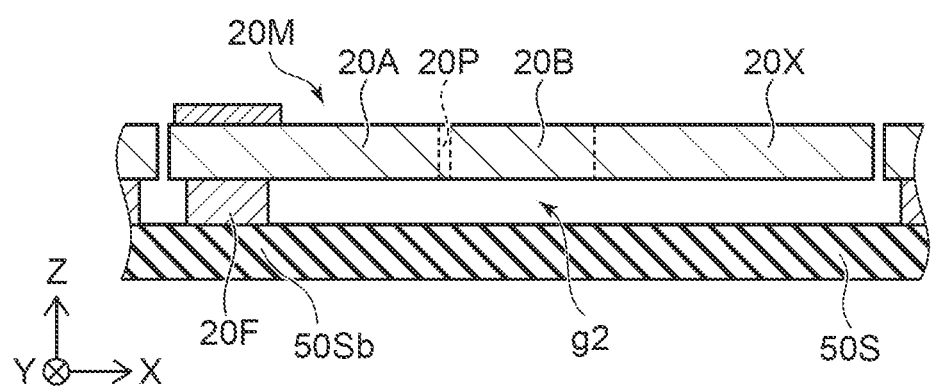

FIGS. 5A and 5B are schematic views illustrating a part of the sensor according to the first embodiment.

FIG. 5A is a plan view. FIG. 5B is a cross-sectional view taken along the line X1-X2 of FIG. 5A.

As shown in FIGS. 5A and 5B, the second sensor part 20U includes the second sensor fixed part 20F and the second sensor movable part 20M. The second sensor fixed part 20F is fixed to the second base body region 50Sb. The second gap g2 is provided between the base body 50S and the second sensor movable part 20M.

The second sensor movable part 20M includes a first movable base part 20A, a second movable base part 20B, a first movable beam 21M, and a second movable beam 22M. The first movable base part 20A is supported by the second sensor fixed part 20F. The second movable base part 20B is connected with the first movable base part 20A. In this example, the second sensor movable part 20M further includes a connecting base part 20P. The connecting base part 20P connects the second movable base part 20B with the first movable base part 20A.

The first movable beam 21M includes the first beam 21. The second movable beam 22M includes the second beam 22. The first beam 21 includes a first end portion 21e and a first other end portion 21f. The first end portion 21e is connected with the first movable base part 20A. The first other end portion 21f is connected with the second movable base part 20B.

The second beam 22 includes a second end portion 22e and a second other end portion 22f. The second end portion 22e is connected with the first movable base part 20A. The second other end portion 22f is connected with the second movable base part 20B.

The extension direction from the first movable base part 20A to the second movable base part 20B crosses the direction (Z-axis direction) from the second base body region 50Sb to the second sensor fixed part 20F. In this example, the extension direction is along the X-axis direction.

The first beam 21 and the second beam 22 are along the extension direction (for example, the X-axis direction). The crossing direction from the second beam 22 to the first beam 21 crosses a plane including the extension direction (X-axis direction) and the Z-axis direction (direction from the second base body region 50Sb to the second sensor fixed part 20F). The crossing direction is, for example, the Y-axis direction. The connecting base part 20P is between the second beam 22 and the first beam 21 in the crossing direction (Y-axis direction).

The second sensor movable part 20M may further include a movable member 20X. The movable member 20X is connected with the second movable base part 20B. The second movable base part 20B is between the first movable base part 20A and the movable member 20X. The second movable base part 20B is between the connecting base part 20P and the movable member 20X.

For example, when the acceleration (or force) is applied to the second sensor movable part 20M, the movable member 20X is displaced around the connecting base part 20P. With the displacement, the second movable base part 20B is displaced. As a result, one of the compressive and tensile stresses is applied to one of the first beam 21 and the second beam 22. The other stress of compression or tension is applied to the other of the first beam 21 and the second beam 22. The resonance frequency of these beams changes depending on the stress received. The acceleration can be detected by detecting the difference between the first resonance frequency F1 of the first beam 21 and the second resonance frequency F2 of the second beam 22.

As shown in FIG. 5A, a length along the crossing direction (Y-axis direction) of the movable member 20X is defined as a length LX. A length along the crossing direction of the second movable base part 20B is defined as a length L2. The length LX is longer than the length L2. By providing the large movable member 20X, the stress applied to the beam can be increased. For example, it is easy to obtain high sensitivity.

Figure 6:
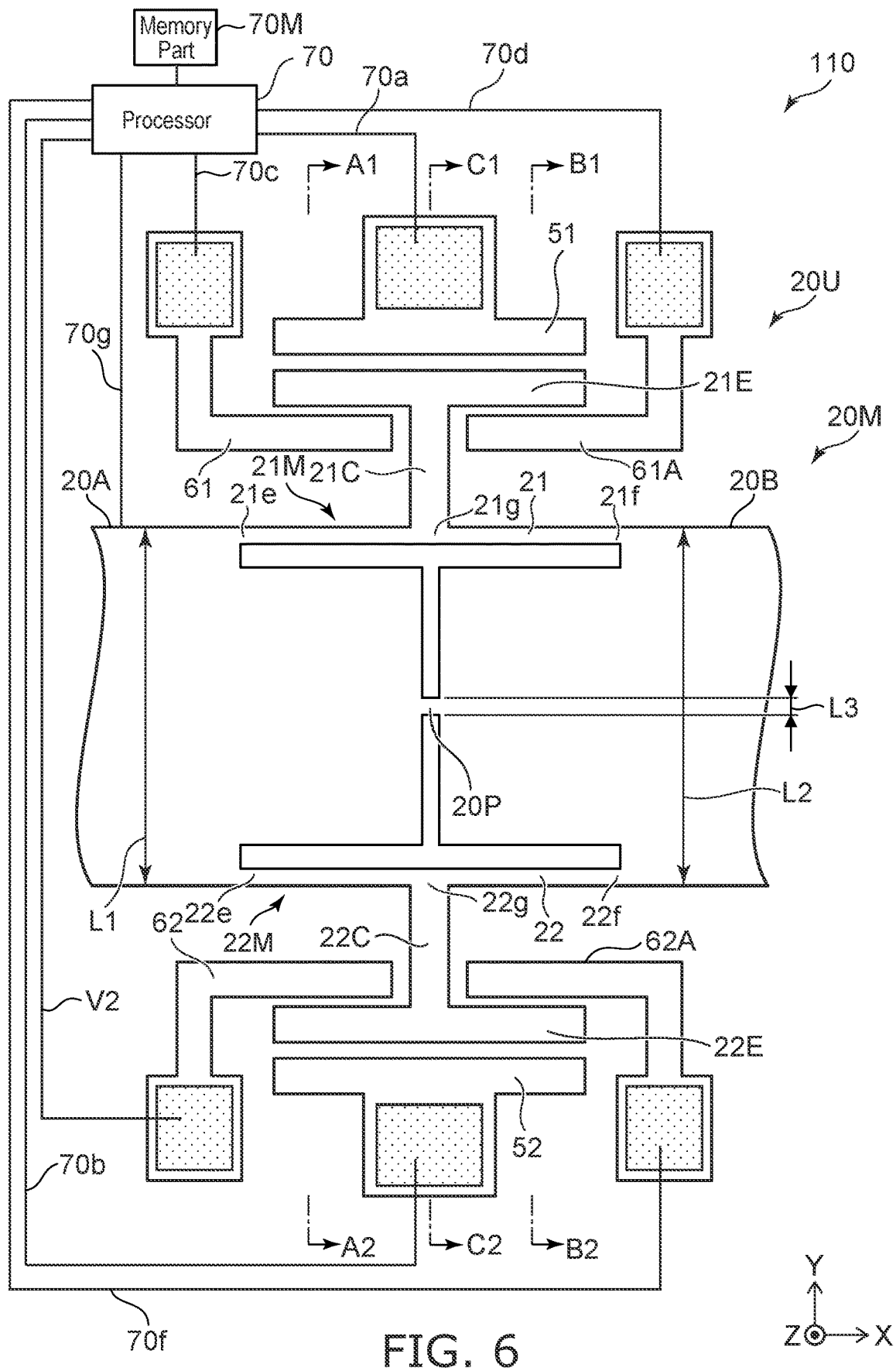
FIG. 6 is a schematic plan view illustrating a part of the sensor according to the first embodiment.

FIG. 6 is a schematic plan view illustrating a part of the sensor according to the first embodiment.

Figure 7A:
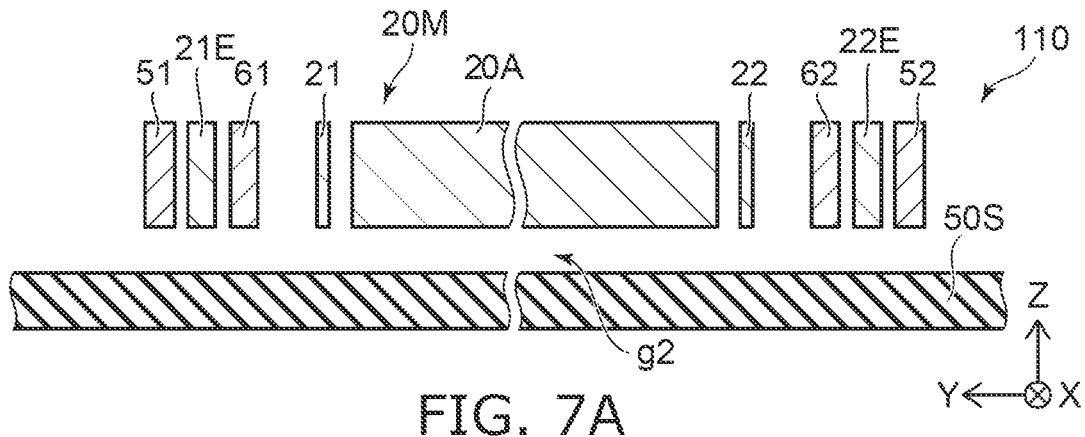
FIGS. 7A to 7C are schematic cross-sectional views illustrating a part of the sensor according to the first embodiment.
Figure 7B:
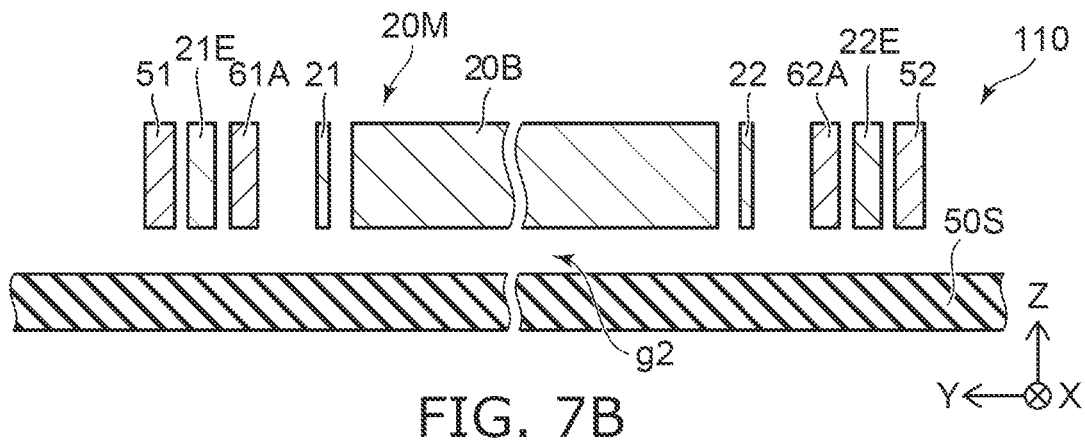
Figure 7C:
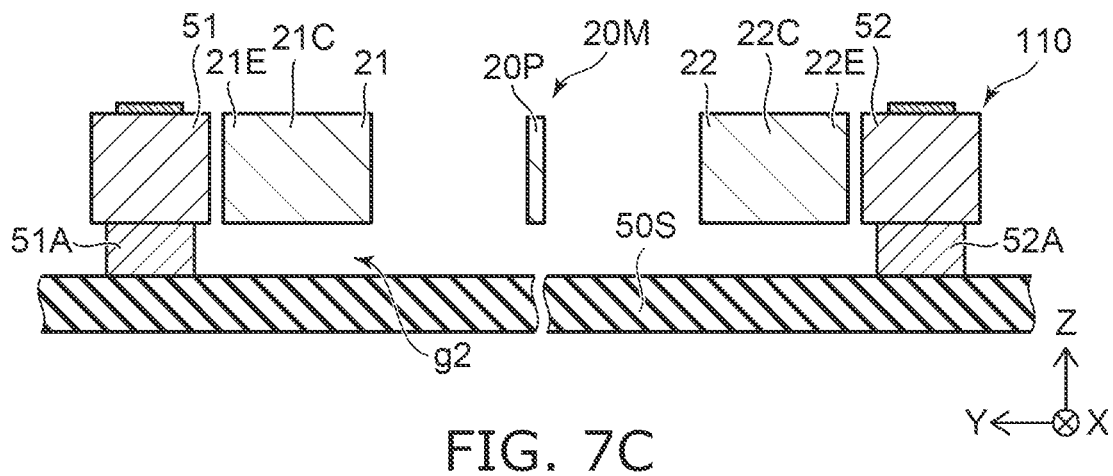

FIGS. 7A to 7C are schematic cross-sectional views illustrating a part of the sensor according to the first embodiment.

FIG. 6 is an enlarged view of a part of FIG. 5A. FIG. 7A is a sectional view taken along line A1-A2 of FIG. 6. FIG. 7B is a sectional view taken along line B1-B2 of FIG. 6. FIG. 7C is a cross-sectional view taken along the line C1-C2 of FIG. 6.

As shown in FIG. 6, a length along the crossing direction (for example, the Y-axis direction) of the connecting base part 20P is defined as a length L3. A length along the crossing direction of the first movable base part 20A is defined as a length L1. A length along the crossing direction of the second movable base part 20B is defined as a length L2. The length L3 is shorter than the length L1 and shorter than the length L2. The connecting base part 20P functions as a pivot portion. By providing the small connecting base part 20P, the movable member 20X is easily displaced. The stress applied to the first beam 21 and the second beam 22 becomes large. High sensitivity is easy to obtain.

As shown in FIG. 6, the first movable beam 21M includes a first movable connecting portion 21C and a first extension portion 21E. The first beam 21 includes a first intermediate portion 21g. The first intermediate portion 21g is between the first end portion 21e and the first other end portion 21f. The first movable connecting portion 21C connects the first extension portion 21E with the first intermediate portion 21g. The first extension portion 21E extends along the X-axis direction.

As shown in FIG. 6, the second movable beam 22M includes a second movable connecting portion 22C and the second extension portion 22E. The second beam 22 includes a second intermediate portion 22g. The second intermediate portion 22g is between the second end portion 22e and the second other end portion 22f. The second movable connecting portion 22C connects the second extension portion 22E with the second intermediate portion 22g. The second extension portion 22E extends along the X-axis direction.

As shown in FIG. 6, the second sensor part 20U includes a first electrode 51 and a second electrode 52. The first electrode 51 faces the first extension portion 21E. The second electrode 52 faces the second extension portion 22E. The second sensor part 20U includes a first conductive portion 61 and another first conductive portion 61A. These conductive portions face the first extension portion 21E. The second sensor part 20U includes a second conductive portion 62 and another second conductive portion 62A. These conductive portions face the second extension portion 22E.

The processor 70 is electrically connected with the first electrode 51, the second electrode 52, the first conductive portion 61, another first conductive portion 61A, the second conductive portion 62, and another second conductive portion 62A. The electrical connection is made, for example, by wiring 70a-70f.

The processor 70 applies a drive signal between the conductive portion and the extension portion, for example. As a result, the first beam 21 and the second beam 22 vibrate. The processor 70 detects a signal generated between the electrode and the extension portion. As a result, the first resonance frequency F1 of the first beam 21 and the second resonance frequency F2 of the second beam 22 can be detected. The drive signal may be applied between the electrode and the extension portion, and the signal generated between the conductive portion and the extension portion may be detected.

Based on the detected first resonance frequency F1 and second resonance frequency F2, the temperature T can be detected by referring to the temperature characteristics of the resonance frequency stored in the memory part 70M. For example, data regarding the relationship between the acceleration G, the temperature T, the first resonance frequency F1 and the second resonance frequency F2 is stored in the memory part 70M. For example, a table or function for these values is stored. The acceleration G and temperature T are derived based on the stored table or function.

As shown in FIGS. 7A to 7C, the second gap g2 is provided between the base body 50S and the first beam 21 and between the base body 50S and the second beam 22.

Second Embodiment

The second embodiment relates to an electronic device.

Figure 8:
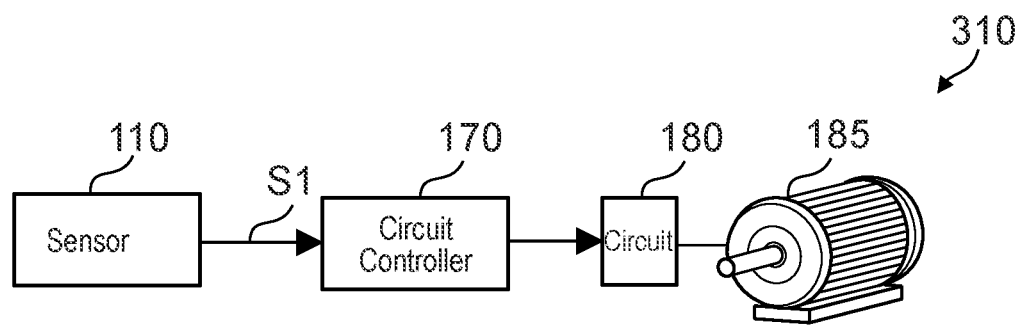
FIG. 8 is a schematic diagram illustrating an electronic device according to a second embodiment.

FIG. 8 is a schematic view illustrating an electronic device according to the second embodiment.

As shown in FIG. 8, an electronic device 310 according to the second embodiment includes the sensor 110 according to the first embodiment and a circuit controller 170. The circuit controller 170 is configured to control a circuit 180 based on a signal 51 obtained from the sensor 110. The circuit 180 is, for example, a control circuit of a drive device 185. According to the embodiment, the circuit 180 for controlling the drive device 185 can be controlled with high accuracy based on the detection result with high accuracy.

FIGS. 9A to 9H are schematic views illustrating applications of the electronic device.

Figure 9A:
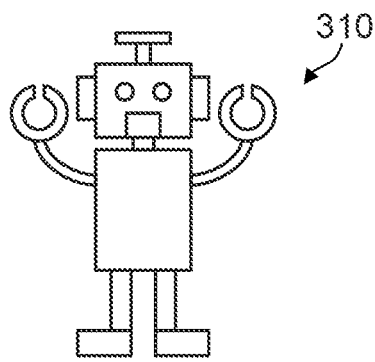
FIGS. 9A to 9H are schematic diagrams illustrating applications of the electronic device.
Figure 9B:
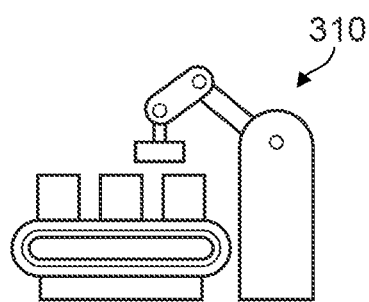
Figure 9C:
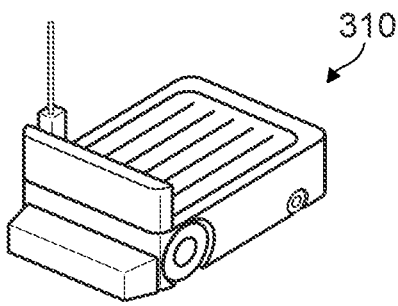
Figure 9D:
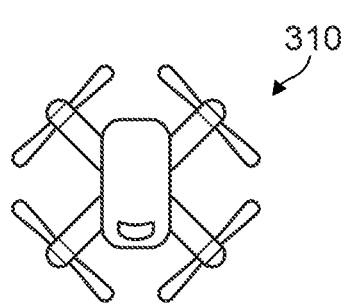
Figure 9E:
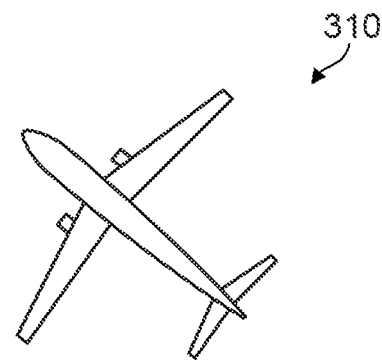
Figure 9F:
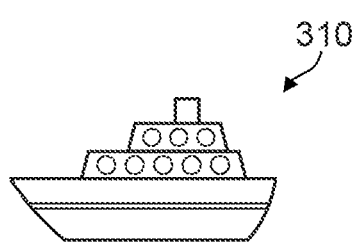
Figure 9G:
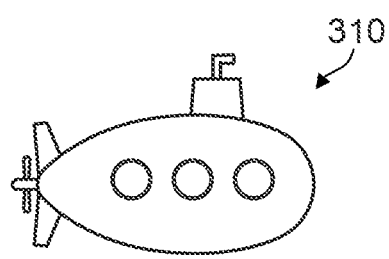
Figure 9H:
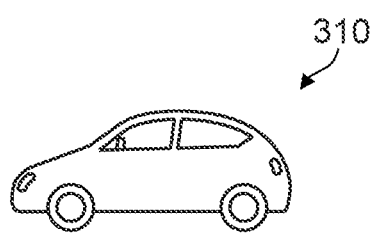

As shown in FIG. 9A, the electronic device 310 may be at least a part of a robot. As shown in FIG. 9B, the electronic device 310 may be at least a part of a machining robot provided in a manufacturing plant or the like. As shown in FIG. 9C, the electronic device 310 may be at least a part of an automatic guided vehicle such as in a plant. As shown in FIG. 9D, the electronic device 310 may be at least a part of a drone (unmanned aircraft). As shown in FIG. 9E, the electronic device 310 may be at least a part of an airplane. As shown in FIG. 9F, the electronic device 310 may be at least a part of a ship. As shown in FIG. 9G, the electronic device 310 may be at least a part of a submarine. As shown in FIG. 9H, the electronic device 310 may be at least a part of an automobile. The electronic device 310 according to the third embodiment may include, for example, at least one of a robot and a mobile body.

The embodiment may include the following configurations (for example, technical proposals).

Configuration 1

A sensor, comprising:
a sensor element;
a housing provided around the sensor element; and
a processor,
the sensor element including
    a base body including a first base body region and a second base body region,
    a first sensor part provided in the first base body region, the first sensor part including a first sensor movable part which can vibrate, vibration of the first sensor movable part including a first component in a first direction and a second component in a second direction crossing the first direction, and
    a second sensor part provided in the second base body region and including a first beam and a second beam,
the processor being configured to derive a rotation angle and an angular velocity based on a signal obtained from the first sensor movable part,
the processor being configured to detect acceleration and a temperature based on a first resonance frequency of the first beam and a second resonance frequency of the second beam, and
the processor being configured to correct at least one of the rotation angle or the angular velocity based on at least one of the temperature or the acceleration.

Configuration 2

The sensor according to Configuration 1, wherein
the processor is configured to correct at least one of the acceleration or the temperature based on the angular velocity.

Configuration 3

The sensor according to Configuration 1 or 2, wherein
the processor is configured to correct the acceleration based on the angular velocity.

Configuration 4

The sensor according to any one of Configurations 1 to 3, wherein
the sensor is configured to correct the rotation angle, the angular velocity, the acceleration, and the temperature based on a matrix.

Configuration 5

The sensor according to Configuration 4, wherein
the matrix includes an off-diagonal component.

Configuration 6

The sensor according to any one of Configurations 1 to 5, wherein
an atmospheric pressure in a space inside the housing is less than 1 atm.

Configuration 7
  The sensor according to any one of Configurations 1 to 6, wherein
    the processor is configured to perform a first mode and a second mode,
    in the first mode, the processor is configured to derive the rotation angle based on a ratio of a first amplitude of the first component and a second amplitude of the second component, and
    in the second mode, the processor is configured to derive the angular velocity based on a change of a control signal that makes a vibration state of the first sensor movable part constant.

Configuration 8
  The sensor according to Configuration 7, wherein the processor is configured to further perform a third mode, and
    in the third mode, the processor is configured to supply a third mode signal to the first sensor part, the third mode signal vibrating the first sensor movable part in an arbitrary state.

Configuration 9
  The sensor according to any one of Configurations 1 to 8, wherein
    the first sensor part includes
      a first sensor fixed part fixed to the first base body region,
      a first sensor supporter supported by the first sensor fixed part and supporting the first sensor movable part,
      a first sensor counter electrode facing the first sensor movable part, and
    a first gap is provided between the base body and the first sensor supporter and between the base body and the first sensor movable part.

Configuration 10
  The sensor according to Configuration 9, wherein
    the first sensor movable part is provided around at least a part of the first sensor fixed part in a plane crossing a direction from the first base body region to the first sensor fixed part.

Configuration 11
  The sensor according to Configuration 9, wherein
    the first sensor movable part includes a first vibration electrode and a second vibration electrode,
    the first sensor counter electrode includes a first counter vibration electrode facing the first vibration electrode and a second counter vibration electrode facing the second vibration electrode,
    a direction from the first sensor fixed part to the first counter vibration electrode and a direction from the first sensor fixed part to the second counter vibration electrode cross a direction from the first base body region to the first sensor fixed part, and
    the direction from the first sensor fixed part to the first counter vibration electrode crosses the direction from the first sensor fixed part to the second counter vibration electrode.

Configuration 12
  The sensor according to Configuration 11, wherein
    the first sensor movable part includes a first sensing electrode and a second sensing electrode,
    the first sensor counter electrode includes a first counter sensing electrode facing the first sensing electrode and a second counter sensing electrode facing the second sensing electrode,
    the first sensor fixed part is between the first vibration electrode and the first sensing electrode, and
    the first sensor fixed part is between the second vibration electrode and the second sensing electrode.

Configuration 13
  The sensor according to any one of Configurations 1 to 12, wherein
    the second sensor part includes
      a second sensor fixed part fixed to the second base body region, and
      a second sensor movable part,
    a second gap is provided between the base body and the second sensor movable part,
    the second sensor movable part includes
      a first movable base part supported by the second sensor fixed part,
      a second movable base part connected with the first movable base part,
      a first movable beam including the first beam, and
      a second movable beam including the second beam,
    the first beam includes a first end portion and a first other end portion, the first end portion is connected with the first movable base part, the first other end portion is connected with the second movable base part, and
    the second beam includes a second end portion and a second other end portion, the second end portion is connected with the first movable base part, the second other end portion is connected with the second movable base part.

Configuration 14
  The sensor according to Configuration 13, wherein
    an extension direction from the first movable base part to the second movable base part crosses a direction from the second base body region to the second sensor fixed part,
    the first beam and the second beam are along the extension direction, and
    a crossing direction from the second beam to the first beam crosses a plane including the extension direction and the direction from the second base body region to the second sensor fixed part.

Configuration 15
  The sensor according to Configuration 14, wherein
    the second sensor movable part further includes a connecting base part,
    the connecting base part connects the second movable base part with the first movable base part, and
    a length along the crossing direction of the connecting base part is shorter than a length along the crossing direction of the first movable base part and shorter than a length along the crossing direction of the second movable base part.

Configuration 16
  The sensor according to Configuration 15, wherein
    the second sensor movable part further includes a movable member connected with the second movable base part,
    the second movable base part is between the first movable base part and the movable member, and
    a length along the crossing direction of the movable member is longer than the length along the crossing direction of the second movable base part.

Configuration 17
  The sensor according to any one of Configurations 13 to 16, wherein
    a difference between the first resonance frequency and the second resonance frequency changes according to the acceleration received by the second sensor part.

Configuration 18

The sensor according to any one of Configurations 1 to 17, wherein
the housing includes a first member and a second member connected with the first member,
the sensor element is between the first member and the second member,
the base body is fixed to the first member, and
a third gap is provided between the first sensor movable part and the second member, between the first beam and the second member, and between the second beam and the second member.

Configuration 19

The sensor according to Configuration 18, wherein
the housing further include a side member connected with the first member and the second member,
the sensor element is between a plurality of regions of the side member in a direction crossing a direction from the first member to the second member,
a fourth gap is provided between the first sensor movable part and the side member, and
a fifth gap is provided between the first beam and the side member.

Configuration 20

An electronic device, comprising:
the sensor according to any one of Configurations 1 to 19; and
a circuit controller configured to control a circuit based on a signal obtained from the sensor.

According to the embodiment, a sensor and an electronic device can be provided in which accuracy can be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as sensor elements, sensor parts, movable parts, fixed parts, supporters, base bodies, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a sensor element;
a housing provided around the sensor element; and
a processor,
the sensor element including
a base body including a first base body region and a second base body region,
a first sensor part provided in the first base body region, the first sensor part including a first sensor movable part which can vibrate, vibration of the first sensor movable part including a first component in a first direction and a second component in a second direction crossing the first direction, and
a second sensor part provided in the second base body region and including a first beam and a second beam,
the processor being configured to derive a rotation angle and an angular velocity based on a signal obtained from the first sensor movable part,
the processor being configured to detect an acceleration and a temperature based on a first resonance frequency of the first beam and a second resonance frequency of the second beam, and
the processor being configured to correct the rotation angle and the angular velocity based on at least one of the temperature or the acceleration,
wherein the processor is configured to correct at least one of the acceleration or the temperature based on the angular velocity being corrected based on the at least one of the temperature or the acceleration.

2. The sensor according to claim 1, wherein
the processor is configured to correct the acceleration based on the angular velocity being corrected based on the at least one of the temperature or the acceleration.

3. A sensor, comprising:
a sensor element;
a housing provided around the sensor element; and
a processor,
the sensor element including
a base body including a first base body region and a second base body region,
a first sensor part provided in the first base body region, the first sensor part including a first sensor movable part which can vibrate, vibration of the first sensor movable part including a first component in a first direction and a second component in a second direction crossing the first direction, and
a second sensor part provided in the second base body region and including a first beam and a second beam,
the processor being configured to derive a rotation angle and an angular velocity of an estimation target based on a signal obtained from the first sensor movable part,
the processor being configured to detect an acceleration and a temperature based on a first resonance frequency F1 of the first beam and a second resonance frequency F2 of the second beam, and
the processor being configured to correct at least one of the rotation angle or the angular velocity based on at least one of the temperature or the acceleration,
wherein
the sensor is configured to correct the rotation angle, the angular velocity, the acceleration, and the temperature based on a matrix, the matrix including:
a plurality of first elements of a row of the matrix including an angular output θ1, an output V1 in volt of a control signal, the first resonance frequency F1 and the second resonance frequency F2,
a plurality of second elements of a column of the matrix including a rotation angle θ of the estimation target, an angular velocity Ω of the estimation target, an acceleration G of the estimation target, and a temperature T of the estimation target, and
a plurality of third elements at crosspoints of the row and the column each corresponding to a coefficient between the plurality of first elements and the plurality of second elements.

4. The sensor according to claim 3, wherein
the matrix includes an off-diagonal component.

5. The sensor according to claim 1, wherein
an atmospheric pressure in a space inside the housing is less than 1 atm.

6. The sensor according to claim 1, wherein
the processor is configured to perform a first mode and a second mode,
in the first mode, the processor is configured to derive the rotation angle based on a ratio of a first amplitude of the first component and a second amplitude of the second component, and
in the second mode, the processor is configured to derive the angular velocity based on a change of a control signal that makes a vibration state of the first sensor movable part constant.

7. The sensor according to claim 6, wherein
the processor is configured to further perform a third mode, and
in the third mode, the processor is configured to supply a third mode signal to the first sensor part, the third mode signal vibrating the first sensor movable part in an arbitrary state.

8. The sensor according to claim 1, wherein
the first sensor part includes
a first sensor fixed part fixed to the first base body region,
a first sensor supporter supported by the first sensor fixed part and supporting the first sensor movable part,
a first sensor counter electrode facing the first sensor movable part, and
a first gap is provided between the base body and the first sensor supporter and between the base body and the first sensor movable part.

9. The sensor according to claim 8, wherein
the first sensor movable part is provided around at least a part of the first sensor fixed part in a plane crossing a direction from the first base body region to the first sensor fixed part.

10. The sensor according to claim 8, wherein
the first sensor movable part includes a first vibration electrode and a second vibration electrode,
the first sensor counter electrode includes a first counter vibration electrode facing the first vibration electrode and a second counter vibration electrode facing the second vibration electrode,
a direction from the first sensor fixed part to the first counter vibration electrode and a direction from the first sensor fixed part to the second counter vibration electrode cross a direction from the first base body region to the first sensor fixed part, and
the direction from the first sensor fixed part to the first counter vibration electrode crosses the direction from the first sensor fixed part to the second counter vibration electrode.

11. The sensor according to claim 10, wherein
the first sensor movable part includes a first sensing electrode and a second sensing electrode,
the first sensor counter electrode includes a first counter sensing electrode facing the first sensing electrode and a second counter sensing electrode facing the second sensing electrode,
the first sensor fixed part is between the first vibration electrode and the first sensing electrode, and
the first sensor fixed part is between the second vibration electrode and the second sensing electrode.

12. The sensor according to claim 8, wherein
the second sensor part includes
a second sensor fixed part fixed to the second base body region, and
a second sensor movable part,
a second gap is provided between the base body and the second sensor movable part,
the second sensor movable part includes
a first movable base part supported by the second sensor fixed part,
a second movable base part connected with the first movable base part,
a first movable beam including the first beam, and
a second movable beam including the second beam,
the first beam includes a first end portion and a first other end portion, the first end portion is connected with the first movable base part, the first other end portion is connected with the second movable base part, and
the second beam includes a second end portion and a second other end portion, the second end portion is connected with the first movable base part, the second other end portion is connected with the second movable base part.

13. The sensor according to claim 12, wherein
an extension direction from the first movable base part to the second movable base part crosses a direction from the second base body region to the second sensor fixed part,
the first beam and the second beam are along the extension direction, and
a crossing direction from the second beam to the first beam crosses a plane including the extension direction and the direction from the second base body region to the second sensor fixed part.

14. The sensor according to claim 13, wherein
the second sensor movable part further includes a connecting base part,
the connecting base part connects the second movable base part with the first movable base part, and
a length along a crossing direction of the connecting base part is shorter than a length along a crossing direction of the first movable base part and shorter than a length along a crossing direction of the second movable base part.

15. The sensor according to claim 14, wherein
the second sensor movable part further includes a movable member connected with the second movable base part,
the second movable base part is between the first movable base part and the movable member, and a length along a crossing direction of the movable member is longer than the length along the crossing direction of the second movable base part.

16. The sensor according to claim 12, wherein
a difference between the first resonance frequency and the second resonance frequency changes according to the acceleration received by the second sensor part.

17. The sensor according to claim 12, wherein
the housing includes a first member and a second member connected with the first member,
the sensor element is between the first member and the second member,
the base body is fixed to the first member, and
a third gap is provided between the first sensor movable part and the second member, between the first beam and the second member, and between the second beam and the second member.

18. The sensor according to claim 17, wherein
the housing further include a side member connected with the first member and the second member,
the sensor element is between a plurality of regions of the side member in a direction crossing a direction from the first member to the second member,
a fourth gap is provided between the first sensor movable part and the side member, and
a fifth gap is provided between the first beam and the side member.

19. An electronic device, comprising:
the sensor according to claim 1; and
a circuit controller configured to control a circuit based on a signal obtained from the sensor.

* * * * *